(12) United States Patent
Cler et al.

(10) Patent No.: US 8,326,585 B1
(45) Date of Patent: Dec. 4, 2012

(54) COMPUTATIONAL FLUID DYNAMICS SHOCK WAVE IDENTIFICATION

(75) Inventors: Daniel L. Cler, Coatesville, PA (US); Mark A. Doxbeck, Troy, NY (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 1204 days.

(21) Appl. No.: 12/139,586

(22) Filed: Jun. 16, 2008

Related U.S. Application Data

(60) Provisional application No. 60/944,612, filed on Jun. 18, 2007.

(51) Int. Cl.
*G06F 17/50* (2006.01)
*G06F 7/60* (2006.01)

(52) U.S. Cl. .......................................... 703/2
(58) Field of Classification Search ........................ 703/2
See application file for complete search history.

(56) References Cited

U.S. PATENT DOCUMENTS

| | | | | |
|---|---|---|---|---|
| 5,991,526 A | * | 11/1999 | Igarashi | 703/2 |
| 2004/0138853 A1 | * | 7/2004 | Tanahashi et al. | 702/179 |
| 2006/0058985 A1 | * | 3/2006 | Arslan et al. | 703/2 |
| 2006/0089803 A1 | * | 4/2006 | Lei et al. | 702/1 |

OTHER PUBLICATIONS

Kwan-Liu Ma, John Van Rosendale, Willem Vermeer, "3D Shock Wave Visualization on Unstructured Grids", IEEE, 1996, pp. 87-104.*

* cited by examiner

*Primary Examiner* — Dwin M Craig
(74) *Attorney, Agent, or Firm* — Henry S. Goldfine

(57) ABSTRACT

A method for identifying a shock wave includes creating a grid comprising cells; sorting the cells based on their pressure gradients; and sorting the cells based on a negative dot product of their pressure gradients and their velocity vectors divided by the velocity of sound. The number of cells that are refined may be reduced by sorting the cells based on their distances from a shock wave center, and/or sorting the cells based on their mass fractions of a species. A buffer zone of refined cells may be created in front of the shock wave.

29 Claims, 1 Drawing Sheet

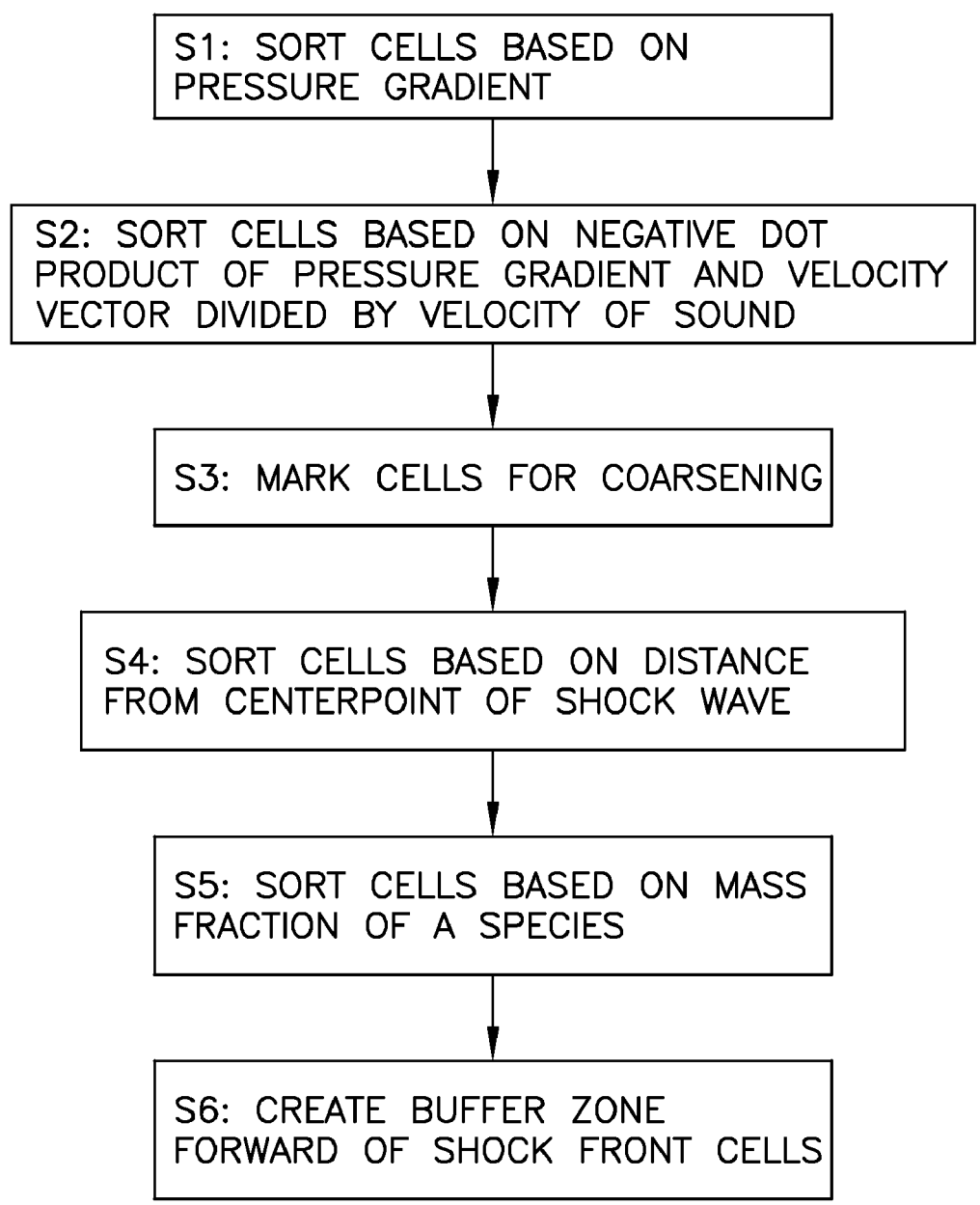

COMPUTATIONAL FLUID DYNAMICS SHOCK WAVE IDENTIFICATION

CROSS-REFERENCE TO RELATED APPLICATIONS

This application claims the benefit under 35 USC 119(e) of U.S. provisional patent application No. 60/944,612 filed on Jun. 18, 2007, which application is hereby incorporated by reference.

STATEMENT OF GOVERNMENT INTEREST

The inventions described herein may be manufactured, used and licensed by or for the U.S. Government for U.S. Government purposes.

BACKGROUND OF THE INVENTION

The invention relates in general to computational fluid dynamics and in particular to the modeling of traveling shocks.

In fluid dynamics, traveling shock waves exist in situations such as, for example, blasts, vehicle-surface interaction with compressible flow, etc. Shock waves are very fine structures on the order of 0.5 mm thick. To properly model shock waves, one must use very fine grid, high-order solvers, and/or discontinuous function solvers. When modeling shock waves with continuous function solvers such as finite volume computational fluid dynamics solvers, it is necessary to use a fine grid and, if possible, higher order solvers. When the problem is unsteady, as is the case with traveling shock waves, the shock waves tend to defuse over time, if not properly modeled.

Because traveling shocks can travel through very large volumes of fluid, it is not practical to utilize fixed grids. A fixed grid size can result in more computations than a typical large high-performance computer can handle. For example, assume a grid resolution of 0.5 mm is fine enough to accurately predict the pressure across a traveling shock wave. Then, for a typical three-dimensional gun blast problem (i.e., about 225 cubic meters of air, or a slice of air the size of a quarter cylinder 2 meters high with a 12 meter radius), a fixed grid size of 0.5 mm requires about $3 \times 10^{12}$ tetrahedral cells. Assuming about 200,000 cells per processor, about 15 million processors would be needed to solve this problem efficiently.

The number of cells (grid size) can be reduced dramatically using dynamic adaptation. However, if the dynamic adaptation scheme is poor, then the resulting number of cells can still be close to the number of cells of the fixed grid. To be practical, the number of cells should be several orders of magnitude smaller than the number of cells in the fixed grid described above. Adaptation is used to refine (decrease the cell size) or coarsen (increase the cell size) the grid structure at a particular location in the flow field. The grid may be coarsened after the shock wave passes through a particular location, thereby reducing the number of cells and computation time. A method is needed to mark the shock properly so that only the cells in the area of the shock wave are adapted and, the refining and coarsening of the grid are properly controlled throughout the simulation.

In the past, computational fluid dynamics (CFD) solvers have typically marked cells using gradients of pressure or some other flow field quantity. This method works to some extent with traveling shock problems. However, it is difficult to only adapt near the shock structure and not adapt at other locations in the flow field where other types of gradients exist. This difficulty results in significantly more grid adaptation than necessary and, consequently, additional computation needs.

Attempts to use known CFD packages with built-in adaptation functionality to solve traveling shock problems has resulted in excessive computation requirements. Some known methods include utilizing text user interface commands to perform complicated manipulation of adaptation registers; combining iso-levels of pressure and pressure gradients through adaptation register combines and then performing adaptation of the combined registers; and trying several types of variables, scaling or normalization levels, and adaptation control.

To minimize the number of cells in the adapted grid size, it is important that only the critical flow features be adapted, and that every thing else in the flow field be left "untouched". Based on experience with the analysis of experimental and CFD blast analysis problems, the most critical flow features in a blast problem are the shock structures. It seems logical that pressure gradients would be a good indicator of shocks. To some extent this is true. However, pressure gradients exist in areas of the flow field other than areas near shocks. As a result, a large portion of the fluid volume can be adapted unnecessarily, leading to large amounts of unneeded computations. There is a need for an ability to detect only shocks and to refine the grid near the shock structures. In addition, there is a need to rapidly increase the cell size in areas that are not near the shock.

A problem that exists with gun blow-down, propagating shock or blast wave problems that does not exist in most compressible adaption scenarios is the extreme range of pressure gradient levels that exist within the flow domain. As a result, to adapt the weak shock structures, which are some of the most important structures in the flow field, one must use very low levels of refinement. Thus, the bulk of the flow field becomes over refined. It is possible to use zonal-based gradient adaption, however, zonal-based gradient adaptation does not address the fundamental need for a good shock detection capability.

There is a need for an improved shock detection and adaption marking method that can be utilized with finite volume computational fluid dynamics codes and provide large increases in performance. Such a method may utilize a computer and computational fluid dynamics computer software code.

It is an object of the invention to provide a method for detecting shock waves in a fluid dynamic model.

It is another object of the invention to provide a method for adapting a grid used to model a shock wave.

It is a further object of the invention to provide a grid adaptation method that reduces computation time, compared to known methods.

One aspect of the invention is a method of identifying a shock wave, comprising creating a grid comprising cells; sorting the cells based on their pressure gradients; and sorting the cells based on a negative dot product of their pressure gradients and their velocity vectors divided by a velocity of sound.

Sorting based on pressure gradients may include marking a cell for coarsening, if an absolute value of its pressure gradient is less than or equal to a preset pressure gradient value. Sorting based on pressure gradients may further include marking a cell for inclusion in the step of sorting based on the negative dot product, if an absolute value of its pressure gradient is greater than the preset pressure gradient value.

Sorting the cells based on the negative dot product may include marking a cell for refinement, if a negative dot product of its pressure gradient and its velocity vector divided by the velocity of sound is greater than a preset minimum dot product value and less than a preset maximum dot product value.

Sorting the cells based on the negative dot product may include marking a cell for coarsening, if a negative dot product of its pressure gradient and its velocity vector divided by the velocity of sound is one of: 1) less than or equal to the preset minimum dot product value, and 2) greater than or equal to the preset maximum dot product value.

The method may further comprise sorting the cells based on their distances from a shock wave center.

Sorting based on distances from a shock wave center may include marking a cell for coarsening, if its distance from the shock wave center is less than or equal to a threshold distance. The threshold distance may be determined from cells marked for refinement in a previous iteration. The threshold distance may be reduced to account for aspherical effects.

The method may further comprise sorting the cells based on their mass fractions of a species.

Sorting based on mass fractions of a species may include marking a cell for coarsening if its mass fraction of a secondary species is less than a threshold mass fraction of the secondary species. The threshold mass fraction of the secondary species may be a percentage of a mean mass fraction of the secondary species of cells marked for refinement in a previous iteration.

The method may further comprise creating a buffer zone adjacent shock front cells. Creating the buffer zone may include identifying contact cells, which are cells that contact at least one shock front cell. Creating the buffer zone may include identifying forward contact cells, which are contact cells that precede the shock wave.

A contact cell may be a forward contact cell, if a dot product of: 1) a vector from a centroid of a first shock front cell to a centroid of the contact cell, and 2) a velocity vector of the first shock front cell, is greater than zero.

The method may further comprise marking forward contact cells for refinement, the buffer zone comprising the forward contact cells.

The method may additionally comprise determining a number of time iterations required for the shock wave to pass through the buffer zone.

Another aspect of the invention is a computer readable medium containing a computer program for performing the method of the invention.

A further aspect of the invention is an apparatus for modeling a shock wave, comprising means for creating a grid comprising cells; means for sorting the cells based on their pressure gradients; and means for sorting the cells based a negative dot product of their pressure gradients and their velocity vectors divided by a velocity of sound.

The apparatus may further comprise one or more of means for sorting the cells based on their distances from a shock wave center; means for sorting the cells based on their mass fractions of a species; means for creating a buffer zone adjacent shock front cells; and means for determining a number of time iterations required for the shock wave to pass through the buffer zone.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 1 is a schematic diagram of a general purpose computer.

FIG. 2 is a schematic diagram of a computer readable medium.

FIG. 3 is a flow chart of one embodiment of the inventive method.

DETAILED DESCRIPTION OF THE PREFERRED EMBODIMENTS

The invention includes a method that may be utilized using a computer, such as the general use computer 10 of FIG. 1. The method may be embodied in computer software that is loaded into and executed by the computer 10. The software may reside on a computer readable medium 12 as shown in FIG. 2. Medium 12 may be a compact disc, floppy disc, zip disc, flash memory, memory stick, etc.

The method seeks to improve CFD analysis of shocks using a dynamic grid. The method may be used for two-dimensional or three-dimensional analysis. A grid may be constructed by connecting a series of nodes (or points) into geometric shapes such as, for example, triangles, quadrilaterals and hexagons for two-dimensional analysis, or pyramids, prisms and other polyhedra for three-dimensional analysis. At a given time, calculations may be performed at the nodes and then averaged out to the cells constructed from the lines connecting the nodes.

The flow field may be initially modeled with a grid comprising a plurality of cells. The initial grid typically uses cells with a surface geometry that is small enough to properly describe the physical surfaces that are being modeled. Further, the initial grid must be fine enough to accurately model flow through small passages. The initial grid in the fair field, that is, in areas distant from surfaces, comprises cells that are very coarse and large in size.

The very large cells in the initial grid will be refined the most. Refining a cell means dividing the cell into smaller cells, each smaller cell having approximately the same volume (or area if a two-dimensional model). For example, a triangular cell can be refined into four cells by connecting the midpoints of each side of the triangle. Coarsening means combining a plurality of cells into a single cell. For example, four triangular cells can be coarsened into a single triangular cell. The original grid is the basis for subsequent refining and, then, coarsening. Cells within the original grid may be refined, but not coarsened beyond their original size. Only cells that have been refined may be coarsened back to their original cell size.

A first step S1 of the method (FIG. 3) is calculating the pressure gradient for each cell. The pressure gradient is the change in pressure over a geometric distance. The more rapidly the pressure changes over a given distance, the larger the gradient. Typically, shocks and blast waves have very large changes in pressure over a very small distance. If the absolute value of the pressure gradient for a cell is greater than a specific threshold value, for example, A, then the cell is selected to proceed to the second step. If the pressure gradient of a cell is less than or equal to the specific threshold value A, then the cell is marked for coarsening, if needed.

The number of times a cell has been refined is monitored. Each cell that is outside the area of interest is marked for coarsening. The method will examine a refined original cell to determine if all the cells within the refined original cell are marked for coarsening. If yes, then the refined cells are joined back together, that is, coarsened. As discussed above, coarsening is needed if the pressure gradient in the cell is equal to or lower than a threshold value, which implies that the cell is not near a shock front. In general, shocks have the largest pressure gradient.

A second step S2 of the method is determining the location of shocks, that is, marking the cells that are part of the shock structure. A cell is part of a shock if the negative of the dot product of: 1) the pressure gradient, from step S1, across the cell, and 2) the velocity vector V (or negative velocity vector) of the cell divided by the velocity of sound in the cell, is greater than a minimum threshold value, for example, B, and less than a maximum threshold value, for example, C. These cells are marked for refinement.

A third step S3 of the method is marking the cells that are not part of the shock structure, as determined in the second step S2. If the negative of the dot product of: 1) the pressure gradient across the cell, and 2) the velocity vector V of the cell divided by the velocity of sound in the cell, is less than or equal to the minimum threshold value B or greater than or equal to the maximum threshold value C, then the cell is marked so that a) the cell is not refined, or b) if the cell has been refined previously, then the cell is marked for coarsening.

Steps S4 and S5 described below are used to prevent the refinement of cells that are not within the shock structure of interest (i.e., the shock front). The above-described steps S1-S3 do not guarantee that only the shock front is being refined. Steps S4 and S5 may result in a loss of refinement of a desired shock structure, in particular, ground reflected shock waves. Therefore, care must be taken when using steps S4 and S5. Steps S4 and S5 are optional. Either one may be performed, with or without the other, and in any order.

A fourth, optional, step S4 of the method relates to cells that were marked for refinement and are not a part of the shock structure of interest. A physical shape (as a function of time) and a center point (origin) for the shock wave of interest are user inputs, and may change during the course of the computational fluid dynamics simulation. For example, point ignitions and barrel blasts have generally spherical shock structures. In the case of a barrel blast, the center point or origin is approximately at the end of the gun barrel (muzzle). Given the shock wave shape and center point, one can calculate a threshold distance based on the mean, maximum or minimum distance from the center point of the shock wave to each of the cells marked for refinement in step two. The threshold distance is used in the next iteration of the method.

Initially, a minimum distance D is user input. When the threshold distance (taken from the previous iteration) from the shock wave center point to all cells marked for refinement in step S2 has reached the minimum value D, and thereafter, any cell that is less than the threshold distance is marked for no refinement, or, if the cell has been previously refined, is marked for coarsening. It is noted that the threshold distance may be reduced by a small amount to account for the aspherical form of the actual shock wave, compared to an ideal sphere.

In the inventive method, a "species" is a chemical element, compound or mixture. In the context of shocks related to firing guns, gun propellant and air are typically two of the species. The "main" species is the gas (products of propellant combustion) emanating from the gun barrel. The "secondary" species is the ambient air outside the gun barrel. Initially, the shock wave will be 100% comprised of the main species. As time passes and the shock wave propagates into the secondary species, the amount of the main species will decrease. At some time, the shock wave will be 100% comprised of the secondary species.

A fifth, optional, step S5 of the method relates to cells that were marked for refinement and are not part of the shock structure of interest. If multiple species are utilized in the model, then the mass fraction of the secondary species (or conversely, the mass fraction of the main species) may be used to limit which cells are to be refined. The mass fraction of the secondary species within each cell marked for refinement in steps S1-S4 (step S4 being optional) is monitored. Also, the mean mass fraction of the secondary species for all refined cells is calculated and used in the next iteration. The mean mass fraction of the secondary species may be used to compute a "threshold" mass fraction of the secondary species. The threshold mass fraction of the secondary species may be a percentage of the mean mass fraction of the secondary species. The percentage value may be a user input, and may change during the course of the computational fluid dynamics simulation.

Those cells having a mass fraction of the secondary species that is less than the threshold mass fraction of the secondary species (determined in the previous iteration) are marked for coarsening. Cells that have been marked for refinement by steps S1 and S2, and not eliminated (marked for coarsening) by steps S4 and S5, are known as "shock front" cells.

A sixth step S6 of the method relates to the shock front cells. A buffer zone around the shock front cells may be selected to be refined. The buffer zone may be at least one cell in thickness. Buffer zone cells are those cells that contact (i.e., have a common face, edge or node with another cell) with at least one shock front cell. To limit the number of cells that are refined because they are part of the buffer zone, only the buffer zone cells that precede the shock ("forward contact cells") are marked for refinement.

A buffer zone cell precedes the shock if the dot product of a) the vector from the centroid of a shock front cell to the centroid of a buffer zone cell, and b) the velocity vector of the same shock front cell, is greater than zero. No matter what has previously happened to these cells, they are always marked for refinement.

The principal reason for defining a buffer zone in front of the shock wave is so that the shock wave will progress into an area that is already refined. This prevents diffusion from occurring. The buffer zone cells form a layer in front of the shock wave. Determining the location of and refining the cells of the buffer zone is important. It is important because the process of refining and coarsening the grid is time consuming. Thus, one needs to know how many iterations it will take the shock wave to pass through the buffer zone. It is not necessary to repeat the process of modifying the grid until the shock wave has progressed to the other side of the buffer zone. To determine the number of iterations it will take for the shock wave to pass through the buffer zone, one needs to know the thickness of the buffer zone, the velocity of the shock wave and the time step per iteration (dt).

The grid is not usually refined for each time iteration of the fluid dynamics model or simulation. The grid may be refined every 10-100 iterations. The larger the thickness of the buffer zone, the greater the number of time iterations that may be performed before a grid modification occurs. The grid modification may take a significantly longer amount of computational time than a single time iteration of the fluid dynamics simulation. A thicker buffer layer adds more cells, which increases computation time. Hence, a balance is needed between the size of the buffer layer and the number of time iterations between grid modifications.

Determining the exact buffer thickness associated with each cell of the shock front is not a trivial calculation. However, simple approximations may be made that yield significant time savings. One may estimate the buffer zone thickness to be the minimum refined edge length of all the cells selected for the buffer zone. The refined edge length of a cell may be calculated by knowing the shape of the cell and its final refined volume (or area for a two-dimensional simulation). Prior to starting the simulation, the user inputs the minimum volume (area for two-dimensional) for each cell and the maximum number of levels of refinement desired. Therefore, a cell will be refined if: 1) it is selected for refinement; 2) its volume is greater than the user entered minimum volume; and 3) it has not already undergone the maximum number of levels of refinement.

By knowing the initial cell volume, how the cell is refined, and the number of levels of refinement actually executed, one may calculate the refined volume of the cell. For example, in a two-dimensional model, each area may be divided into four equal areas of the same shape, for each level of refinement. In a three-dimensional model, by way of example only, each volume may be divided into eight equal volumes of the same shape, for each level of refinement. Using the refined cell volume, one may calculate the refined edge length, based on the shape of the cell. For example, for a tetrahedron, the edge length is $((12*Volume)/\sqrt{2})^{(1/3)}$. The refined edge length may be calculated for each cell added to the buffer zone in step S6.

The velocity of the shock front may be estimated as either 1) the velocity of the shock front cell having the maximum velocity; or 2) the average velocity of all the shock front cells. The magnitude of a cell's velocity vector is the square root of the sum of the squares of the velocity components. The shock front velocity may also be calculated during step S6.

Using the kinematic equation for straight line motion with zero acceleration, the number of iterations (NI) required for a shock front with velocity SV to pass through a buffer zone of thickness BT, with a time step per iteration of dt, is NI=(BT/SV)/dt. To ensure that the shock front never makes it all the way through the buffer zone prior to grid modification, the value of NI may be divided by two.

Shock simulations are typically done with solvers that are explicit in both time and space. As a result, the time step per iteration, dt, of the explicit solver is determined by a minimum length scale. The time it would take a flow particle to traverse a single cell in the grid is the minimum cell length divided by the velocity. This time is calculated for every cell in the flow field. The cell with the minimum traverse time in the entire flow field is the cell that determines the minimum length scale. A global time step for a single iteration is determined by multiplying this minimum traverse time by the Courant Number setting. Typically, the Courant Number value is in the range of 1-2, based on stability concerns. The global time step becomes the current time step size, dt, for a given iteration.

As disclosed herein, the method may identify, mark, and adapt traveling shock waves in finite volume computational fluid dynamics flow solvers. The method may detect both strong and weak shock structures with equal precision. The method may ignore pressure gradients in the flow field where shocks do not exist and mark cells in the flow field where the shocks exist. The method may refine cells in the location of the detected shock and coarsen cells in locations where shocks do not exist or locations that are no longer of interest. The method may provide a memory of cells that were part of a detected shock. The method can create a buffer zone of refined cells adjacent to the detected shock. The method may coarsen cell size once the shock structure has passed the current location. The method may determine the time and/or number of iterations required for the detected shock wave to pass through the buffer zone.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A non-transitory computer readable medium containing a computer program for performing a method of identifying a shock wave, the method comprising:
   creating a grid comprising cells;
   sorting the cells based on their pressure gradients; and
   sorting the cells based on a negative dot product of their pressure gradients and their velocity vectors divided by a velocity of sound;
   wherein sorting based on pressure gradients includes marking a cell for coarsening, if an absolute value of its pressure gradient is less than or equal to a preset pressure gradient value; and
   wherein sorting based on pressure gradients includes marking a cell for inclusion in the step of sorting based on the negative dot product, if an absolute value of its pressure gradient is greater than the preset pressure gradient value.

2. A method of identifying a shock wave, comprising:
   using a computer and the non-transitory computer readable medium of claim 1, creating a grid comprising cells;
   using the computer and the non-transitory computer readable medium of claim 1, sorting the cells based on their pressure gradients; and
   using the computer and the non-transitory computer readable medium of claim 1, sorting the cells based on a negative dot product of their pressure gradients and their velocity vectors divided by a velocity of sound;
   wherein sorting based on pressure gradients includes marking a cell for coarsening, if an absolute value of its pressure gradient is less than or equal to a preset pressure gradient value; and
   wherein sorting based on pressure gradients includes marking a cell for inclusion in the step of sorting based on the negative dot product, if an absolute value of its pressure gradient is greater than the preset pressure gradient value.

3. The method of claim 2, wherein sorting the cells based on the negative dot product includes marking a cell for refinement, if a negative dot product of its pressure gradient and its velocity vector divided by the velocity of sound is greater than a preset minimum dot product value and less than a preset maximum dot product value.

4. The method of claim 3, wherein sorting the cells based on the negative dot product includes marking a cell for coarsening, if a negative dot product of its pressure gradient and its velocity vector divided by the velocity of sound is one of: 1) less than or equal to the preset minimum dot product value, and 2) greater than or equal to the preset maximum dot product value.

5. The method of claim 2, further comprising sorting the cells based on their distances from a shock wave center.

6. The method of claim 5, wherein the step of sorting based on distances includes marking a cell for coarsening, if its distance from the shock wave center is less than or equal to a threshold distance.

7. The method of claim 6, wherein the threshold distance is determined from cells marked for refinement in a previous iteration.

8. The method of claim 7, wherein the threshold distance is reduced to account for aspherical effects.

9. The method of claim 2, further comprising sorting the cells based on their mass fractions of a species.

10. The method of claim 9, wherein the step of sorting based on mass fractions includes marking a cell for coarsening if its mass fraction of a secondary species is less than a threshold mass fraction of the secondary species.

11. The method of claim 10, wherein the threshold mass fraction of the secondary species is a percentage of a mean mass fraction of the secondary species of cells marked for refinement in a previous iteration.

12. The method of claim 2, further comprising creating a buffer zone adjacent shock front cells.

13. The method of claim 12, wherein creating the buffer zone includes identifying contact cells, which are cells that contact at least one shock front cell.

14. The method of claim 13, wherein creating the buffer zone includes identifying forward contact cells, which are contact cells that precede the shock wave.

15. The method of claim 14, wherein a contact cell is a forward contact cell, if a dot product of: 1) a vector from a centroid of a first shock front cell to a centroid of the contact cell, and 2) a velocity vector of the first shock front cell, is greater than zero.

16. The method of claim 15, further comprising marking forward contact cells for refinement, the buffer zone comprising the forward contact cells.

17. The method of claim 16, further comprising determining a number of time iterations required for the shock wave to pass through the buffer zone.

18. The method of claim 17, wherein a thickness of the buffer zone is a refined edge length of a buffer zone cell having a minimum refined edge length.

19. The method of claim 18, wherein a velocity of the shock wave is one of 1) a velocity of a shock front cell having a maximum velocity and 2) an average velocity of all shock front cells.

20. The method of claim 19, wherein a time step for an iteration is the product of a minimum traverse time and a Courant Number.

21. The method of claim 20, wherein the number of time iterations, NI, required for the shock wave to pass through the buffer zone is a quotient of the buffer zone thickness divided by the shock wave velocity, divided by the time step.

22. The method of claim 21, wherein the grid is adjusted about every NI/2 time iterations.

23. An apparatus for modeling a shock wave, comprising:
a computer and a non-transitory computer readable medium, the computer and the non-transitory computer readable medium including
means for creating a grid comprising cells;
means for sorting the cells based on their pressure gradients; and
means for sorting the cells based a negative dot product of their pressure gradients and their velocity vectors divided by a velocity of sound;
wherein the means for sorting based on pressure gradients includes means for marking a cell for coarsening, if an absolute value of its pressure gradient is less than or equal to a preset pressure gradient value; and
wherein the means for sorting based on pressure gradients includes means for marking a cell for inclusion in the step of sorting based on the negative dot product, if an absolute value of its pressure gradient is greater than the preset pressure gradient value.

24. The apparatus of claim 23, wherein the means for sorting the cells based on the negative dot product includes means for marking a cell for refinement, if a negative of a dot product of its pressure gradient and its velocity vector divided by a velocity of sound is greater than a preset minimum dot product value and less than a preset maximum dot product value.

25. The apparatus of claim 24, wherein the means for sorting the cells based on the negative dot product includes means for marking a cell for coarsening, if a negative of a dot product of its pressure gradient and its velocity vector divided by a velocity of sound is one of: 1) less than or equal to the preset minimum dot product value, and 2) greater than or equal to the preset maximum dot product value.

26. The apparatus of claim 23, wherein the computer and the non-transitory computer readable medium further include means for sorting the cells based on their distances from a shock wave center.

27. The apparatus of claim 23, wherein the computer and the non-transitory computer readable medium further include means for sorting the cells based on their mass fractions of a species.

28. The apparatus of claim 23, wherein the computer and the non-transitory computer readable medium further include means for creating a buffer zone adjacent shock front cells.

29. The apparatus of claim 28, wherein the computer and the non-transitory computer readable medium further include means for determining a number of time iterations required for the shock wave to pass through the buffer zone.

* * * * *